US012706853B2

(12) United States Patent
Bowers et al.

(10) Patent No.: US 12,706,853 B2
(45) Date of Patent: Aug. 11, 2026

(54) TIMESTAMP SYNCHRONIZATION BETWEEN HOST AND NETWORK INTERFACE DEVICE

(71) Applicant: Intel Corporation, Santa Clara, CA (US)

(72) Inventors: Gregory J. Bowers, Hillsboro, OR (US); Priyalee Kushwaha, Hillsboro, OR (US); Joshua A. Hay, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/696,754

(22) Filed: Mar. 16, 2022

(65) Prior Publication Data

US 2022/0210084 A1 Jun. 30, 2022

(51) Int. Cl.
*H04L 47/28* (2022.01)
*H04L 47/32* (2022.01)

(52) U.S. Cl.
CPC .............. *H04L 47/28* (2013.01); *H04L 47/32* (2013.01)

(58) Field of Classification Search
None
See application file for complete search history.

(56) References Cited

U.S. PATENT DOCUMENTS 7,418,523 B2 * 8/2008 Pettyjohn .............. H04L 47/564 370/235
8,170,212 B2 * 5/2012 Pering ................... H04W 12/04 713/168
10,742,555 B1 * 8/2020 Shalev ..................... H04L 47/11
10,860,197 B1 * 12/2020 Gibeau ............... G06F 11/3452
2002/0061012 A1 * 5/2002 Thi ..................... H04L 12/5692 370/352
2005/0144309 A1 * 6/2005 Gish ..................... H04L 47/263 709/233
2011/0302143 A1 * 12/2011 Lomet ................ G06F 16/2322 707/704

(Continued)

FOREIGN PATENT DOCUMENTS

CN 108111306 A * 6/2018
CN 106707873 B * 2/2019 ............... H04Q 9/04
WO WO-0223824 A2 * 3/2002 ......... H04L 12/5692

OTHER PUBLICATIONS

Cardwell, Neal et al., "BBR: Congestion-Based Congestion Control", https://research.google/pubs/pub45646/, ACM queue, vol. 14, Issue 5, Dec. 1, 2016, 28 pages.

(Continued)

*Primary Examiner* — Kodzovi Acolatse
(74) *Attorney, Agent, or Firm* — Compass IP Law PC

(57) ABSTRACT

Examples described herein relate to a network interface device that includes first circuitry to negotiate supported timestamp parameters and selectively translate a timestamp associated with a packet based on the timestamp parameters and second circuitry to cause transmission of the packet based on the translated timestamp. In some examples, selectively translate a timestamp associated with a packet based on the timestamp parameters includes translates a value of the timestamp in a transmit descriptor associated with the packet.

20 Claims, 12 Drawing Sheets

(56) References Cited

U.S. PATENT DOCUMENTS

2013/0031482 A1* 1/2013 Saul .................... G06F 3/0488 715/740
2015/0370535 A1* 12/2015 Ralston ................ H04L 49/901 710/310
2018/0203481 A1* 7/2018 Chen .................... H04J 3/0661
2022/0086100 A1* 3/2022 Biederman ............ H04L 47/56
2022/0182182 A1* 6/2022 Zha .......................... H04L 1/22
2023/0050776 A1* 2/2023 Livne ................. H04L 49/9047
2023/0063243 A1* 3/2023 St. Pierre ........... H04L 47/2433
2023/0298739 A1* 9/2023 Williams .............. G16H 50/20 705/2
2024/0146998 A1* 5/2024 Lynch ............. H04N 21/42203
2024/0414667 A1* 12/2024 Jacobsen .......... H04W 56/0015

OTHER PUBLICATIONS

Kumar, Gautam et al., “Swift: Delay is Simple and Effective for Congestion Control in the Datacenter”, https://research.google/pubs/pub49448/, SIGCOMM ’20, Aug. 10-14, 2020, Virtual Event, USA, 15 pages.
Mittal, Radhika et al., “Timely: RTT-based Congestion Control for the Datacenter”, https://research.google/pubs/pub43840/, SIGCOMM ’15, Aug. 17-21, 2015, London, United Kingdom, 14 pages.
Sanchez-Palencia, Jesus, “Time based packet transmission”, LWN.net, https://lwn.net/Articles/748744/, Mar. 6, 2018, 9 pages.

* cited by examiner

TIMESTAMP SYNCHRONIZATION BETWEEN HOST AND NETWORK INTERFACE DEVICE

BACKGROUND

A host device can execute applications and drivers that schedule packets for transmission at particular time slots. Timestamps are used by a host and a network interface controller (NIC) for a variety of purposes. Packet transmit pacing has applications in areas such as video streaming and executing congestion control to control operation of a NIC to transmit a packet at or near a particular time slot. For example, Linux supports the SO_TXTIME socket option, which allows applications and network protocols to request pacing of packet transmission. Packet event timestamps provide data for congestion control. For example, a NIC may report packet events as a time a packet was scheduled for transmission (e.g., transmit (Tx) descriptor fetch), when a packet was transmitted, when a packet was received, or when a packet was delivered to a host (e.g., receive (Rx) descriptor write back).

A congestion window (CWND) can be a number of packets that are transmitted or a total number of bytes or size of packets that have been transmitted. A round trip time (RTT) can represent an amount of time between when a packet is transmitted and a time of acknowledgement of packet receipt. A CWND size can be used to adjust a transmit rate of packets. For example, a congestion control algorithm can use CWND and RTT to calculate a dynamic packet transmit pacing rate based on current network conditions and determine and communicate a packet transmit (Tx) timestamp to a NIC.

DETAILED DESCRIPTION

A host and NIC can share a timestamp value configuration that includes details such as a bit increment value or granularity of a bit and the range of time slot values over which the NIC can operate. In some cases, timestamp formats can be fixed so that the host and NIC utilize a same bit incremental time value. For example, where an 8-bit value represents a timestamp value, the host and NIC can utilize a configuration that represents a bit incremental time value as 5 nanoseconds (ns) so that the NIC interprets a bit incremental time value is 5 ns. For example, a timestamp value of 0010 can represent a timestamp value of 10 ns. However, static configurations may not support changes to timestamp format, such as the number of bits, incremental bit values, or the meaning of the bits. In some cases, timestamp value formats utilized by a host to represent packet transmit (Tx) timestamp to a NIC can vary depending on the software and/or hardware that generates the Tx timestamp but the NIC does not support multiple timestamp formats. A host-executed NIC driver and the NIC may utilize different conventions for representing time slot values. For example, where an 8-bit value represents a time slot value, the NIC can represent a bit incremental time value as 5 nanoseconds (ns), whereas the host utilizes a convention where a bit incremental time value is 1 ns. Accordingly, the NIC can misinterpret a timestamp value and cause transmission of a packet at an incorrect timestamp.

Timestamp synchronization can be performed at least to attempt to synchronize timestamp value definitions between a host and timestamp values determined by a NIC. In some examples, the host can negotiate with the NIC to determine one or more timestamp formats supported. The host and/or NIC can perform timestamp translation based on one or more supported timestamp formats so that the NIC utilizes a timestamp value communicated by the host and/or the host utilizes a timestamp value communicated by the NIC. For example, among other uses, timestamp translations can allow support of a variable timestamp range over which transmit scheduling can be performed, or packet egress and ingress latencies can be reported.

Figure 1:
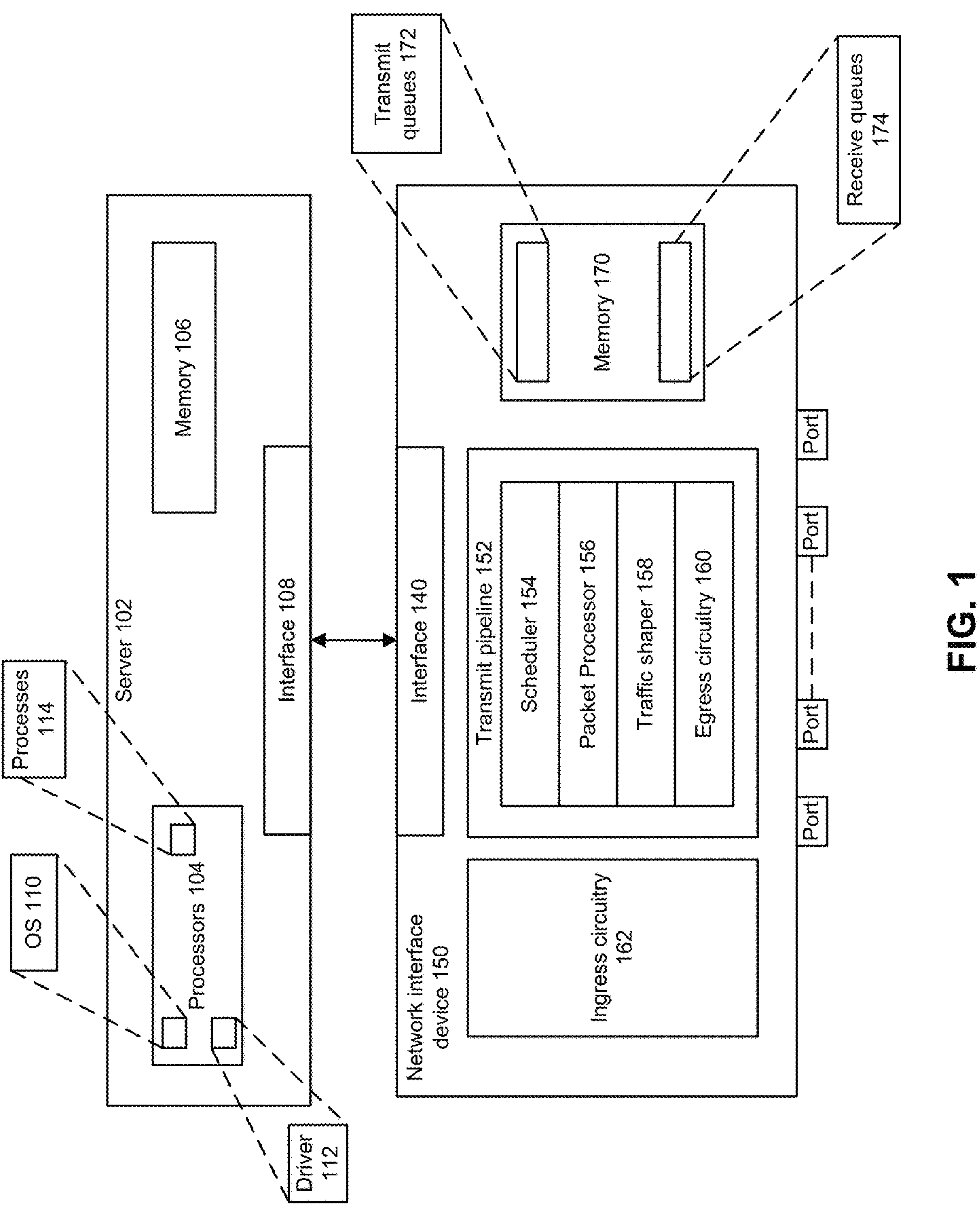
FIG. 1 depicts an example system.

FIG. 1 depicts an example system. Server 102 can include or access one or more processors 104, memory 106, and device interface 108, among other components described herein (e.g., accelerator devices, interconnects, and other circuitry). Processors 104 can execute one or more processes 114 (e.g., microservices, virtual machines (VMs), containers, or other distributed or virtualized execution environment) that utilize or request transmission of packets at particular timeslots by specifying transmit timestamps. Various examples of processors 104 are described herein. In some examples, disaggregated or composite servers formed from hardware and software of multiple servers can execute multi-tenant environments such as VMs, microVMs, containers, applications, or processes. Disaggregated or composite servers can perform workloads from one tenant or different tenants.

Some examples of packet transmission scheduling using timestamps can be used in connection with streaming of data, such as media data. Processes 114 can utilize real-time Transport Protocol (RTP) with Real-time Control Protocol (RTCP) for media stream delivery. RTP can be used to transmit the media stream (e.g., audio and/or video), whereas RTCP can be used to monitor transmission statistics and quality of service (QoS) and aids in the synchronization of audio and video streams. Other control protocols (signaling protocols) can be used such as International Telecommunication Union Telecommunication Standardization Sector (ITU-T) H.323, Session Initiation Protocol (SIP) or Jingle (XMPP). Packet formats can map MPEG-4 audio/video into RTP packets as specified in RFC 3016. Audio payload formats can include, but are not limited to, G.711, G.723, G.726, G.729, GSM, QCELP, MP3, and DTMF. Video payload formats can include, but are not limited to, H.261, H.263, H.264, H.265, and MPEG-1/MPEG-2. For example, some media streaming services use the Dynamic Streaming over HTTP (DASH) protocol or HTTP Live Streaming (HLS). Some streaming protocols allow for control of media playback, recording, or pausing to provide real-time control of media streaming from the server to a client such as video-on-demand (VOD) or media on demand. In some examples, processes 114 can generate media as part of a content delivery network (CDN). A CDN can include geographically distributed servers that deliver content, including media to destination devices.

Processes 114 can generate packet metadata that can be associated with a packet and stored in a linked list. Metadata information carried through the timing slot list can include one or more of: packet transmission timestamp, port identifier (ID), host identifier (HostID), Traffic Class, function, virtual server instance (VSI)/virtual machine (VM) identifiers (IDs), cryptography related information (e.g., encryption or decryption key), scatter gather list (SGL) pointers in host memory, information to support flows such as loopback, large segment offloads (LSO), non-volatile memory express (NVMe), remote direct memory access (RDMA) over Converged Ethernet (RoCE), and so forth.

OS 110 can include or utilize driver 112 to manage network interface device 150 and communicate with network interface device 150. OS 110 can perform a networking stack that extracts the network layer, transport layer and in some cases application layer attributes and parses the network header, transport header and any other upper layer headers before passing the payload to the application. In some examples, OS 110 or driver 112 can enable or disable utilization of timestamp translation technologies, described herein.

Network interface device 150 can be implemented as one or more of: a network interface controller (NIC), a remote direct memory access (RDMA)-enabled NIC, SmartNIC, router, switch, forwarding element, infrastructure processing unit (IPU), or data processing unit (DPU). Network interface device 150 can be communicatively coupled to interface 108 of server 102 using interface 140. Interface 108 and interface 140 can communicate based on Peripheral Component Interconnect Express (PCIe), Compute Express Link (CXL), or other connection technologies. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

Transmit pipeline 152 can provide for packet transmission through one or more ports of network interface device 150. In some examples, transmit pipeline 152 can include transmit scheduler 154, packet processor 156, traffic shaper 158, and egress circuitry 160. In some examples, transmit scheduler 154 can assign packets transmission times in a list among transmit queue 172 stored in memory 170.

Transmit scheduler 154 can select packets in transmit queues 172 for transmission based on packet timestamps. A packet timestamp can represent an earliest departure time of the packet, and use of transmit queues 172 can help ensure that packets are not transmitted until a timer value is greater than or equal to a packet's timestamp. Scheduler 154 can select a slot in transmit queues 172 based on a packet's timestamp by either rounding up or down a timestamp value into a next slot.

To dynamically configure translation of timestamp formats utilized by a host and NIC, OS 110 executed by processors 104 can communicate with packet processor 156 to determine and apply supported timestamp formats. OS 110 and/or packet processor 156 can apply configurations to synchronize parameters to translate timestamps generated by server 102 to a format utilized by NIC 150 or to translate timestamps generated by NIC 150 to a format utilized by server 102. Communications to determine configurations to apply for timestamp translation can include writing and reading from registers in server 102 or NIC 150, writing and reading from hardware tables in command or status registers, or writing and reading communications that include data structures. For example, Linux Virtual Function Driver Virtchannel can be used to transmit timestamp translation and configuration parameters to NIC 150 or server 102.

Timestamp translation and configuration parameters can include one or more of: timestamp bit fields in registers/descriptors (e.g., location and size), timestamp bit granularity (e.g., 1 μs per bit increment, or 2 μs per bit increment, etc.), valid timestamp window horizon range, including where the current time fits within the range, driver behavior when the timestamp is out of the valid range (e.g., indicate overflow, hold the packet until within range), use of absolute or relative timestamp values, including any details (e.g., relative to a reference timestamp value), or definition of exception timestamp values. For example, an exception timestamp value of 0 can indicate no timestamp is to be utilized and the packet is not to be paced or packet was dropped from timestamp events.

In some examples, for packets that are to be transmitted, driver 112 can perform timestamp translation by conversion of a format of a timestamp value provided by processes 114 and/or OS 110 to a format utilized by transmit pipeline 152. In some examples, for packets that are to be transmitted, packet processor 156 can perform timestamp translation by conversion of a format of a timestamp value provided by processes 114 and/or OS 110 to a format utilized by transmit pipeline 152. In some examples, for packets that are received by network interface device 150, driver 112 can perform timestamp translation by conversion of a format of a timestamp value provided by ingress circuitry 162 of network interface device 150 to a format utilized by OS 110 and/or processes 114.

In connection with transmission of packets based on timestamp values, memory 170 can store transmit queues 172. Memory 170 can store receive queues 174 that store packets received by network interface device 150. Transmit queues 172 can include one or more linked lists that store identifiers or metadata of egress packets ordered based on their transmission timestamps. In some examples, egress packets whose transmission rate is not paced may not be identified in transmit queues 172. In some examples, header and tail pointers for a list can be stored in memory 170 as transmit queue 172 and data in the linked lists (e.g., packet meta data) can be stored in memory 170 or memory 106, or other memory device. Memory 170 can be implemented as a volatile memory device including a cache (e.g., Level 1 (L1), Level 2 (L2), Level 3 (L3), and/or last level cache (LLC)). Note that while memory 170 is shown as part of network interface device 150, memory 170 can be part of server 102 or another device.

Network interface device 150 can apply a reliable transport protocol to transmit packets. For example, a reliable transport protocol can include Transmission Control Protocol (TCP), InfiniBand, Internet Wide Area RDMA Protocol (iWARP), User Datagram Protocol (UDP), quick UDP Internet Connections (QUIC), RDMA over Converged Ethernet (RoCE), Amazon's scalable reliable datagram (SRD), or other reliable transport protocols. A receiver network interface device (not shown), that receives packets transmitted from network interface device 150, can perform reordering of packets so that packet payloads with increasing timestamp values are ordered by timestamp values (e.g., increasing timestamp values) for access by a process at a receiver host system (e.g., a server). In some cases, the receiver network interface device or its associated receiver host system (e.g., a server) can perform reorder resilient transport to reorder received packet payloads by order of timestamp values by buffering payload data, and not dropping packets, and filling in timestamp gaps of buffered data with later-received payloads associated with timestamp gaps and providing a sequence of payloads in timestamp order for access by a receiver process. The transmitter and receiver can provide cloud native transport support among applications executing in distributed computing environments.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Figure 2:
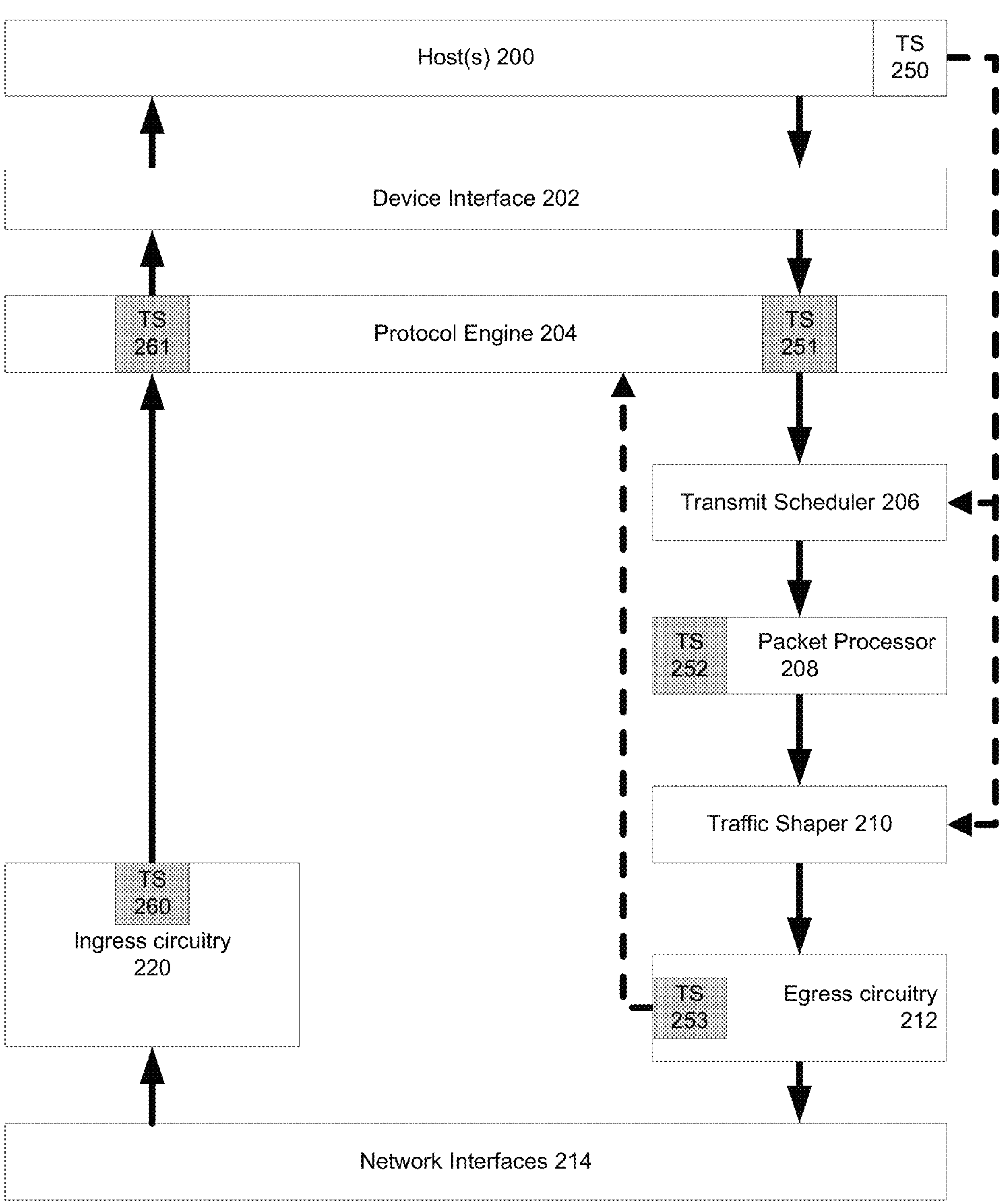
FIG. 2 shows examples of timestamp generation in a network interface device.

FIG. 2 shows examples of timestamp generation in a network interface device. For example, host 200 can generate timestamp 250 to indicate a time of packet transmission by a network interface device. Timestamp 250 can configure transmit scheduler 206, packet processor 208, and/or traffic shaper 210 with a time of transmission of a packet.

Packet processor 208 can perform metering and can perform timestamp translation, in some cases, from a timestamp 250 of a format utilized by host 200 to a format utilized by transmit scheduler 206, packet processor 208, traffic shaper 210, and egress circuitry 212. Transmit scheduler 206 can determine which packet to send next by accessing transmit queues. Traffic shaper 210 can select packets for transmission based on associated timestamps and a current time slot. For example, traffic shaper 210 can utilize a timing wheel with time slots to order packets for transmission. Traffic shaper 210 can reorder packets from a same or different transmit queues for transmission.

Protocol engine (PE) 204 can process descriptor content from host 200 and generate content for descriptor writebacks and completions. For example, PE 204 could extract timestamp 251 from a descriptor and place the descriptor in metadata associated with a packet or packet header. Conversely, PE 204 can include timestamp 261 in a descriptor writeback or completion. Device interface 202 could perform reading and/or writing of descriptors over a bus, such as PCIe.

Protocol engine 204 can determine and report timestamp 251 to host 200 to indicate a time at which a packet was fetched by protocol engine 204 before storage in memory prior to processing and transmission. Similarly, packet processor 208 can determine and report timestamp 251 to host 200 to indicate a time at which a packet was processed by packet processor 208 before storage in memory prior to transmission. Likewise, egress circuitry 212 can determine and report timestamp 253 to host 200 to indicate a time at which a packet was egressed by network interfaces 214 to a network medium (e.g., wired or wireless). Timestamps 251, 252, and 253 can be used to detect congestion in a network interface device. Host 200 can utilize timestamps 251, 252, and 253 to identify a packet transmission backlog in the network interface device. Host 200 can adjust timestamp 250 based on detected transmission backlog in the network interface device in order to delay packet transmission and reduce congestion.

Ingress circuitry 220 can determine and report timestamp 260 to host 200 to indicate a time at which a packet was received by network interfaces 214 from a network medium (e.g., wired or wireless). Protocol engine 204 can determine and report timestamp 261 to host 200 to indicate a time at which a packet was fetched by protocol engine 204 for storage in a memory of host 200. Host 200 can utilize timestamps 260 and 261 to identify a packet receipt backlog in the network interface device and perform remedial actions such as reporting this information to senders so that senders may reduce packet transmission rate.

Note that while examples are described with respect to a network interface device, timestamp translation technologies described herein can be applied to other devices such as a storage controller, memory pool with one or more dual inline memory modules (DIMMs), storage node, accelerator, or other multi-stage hardware device.

Figure 3:
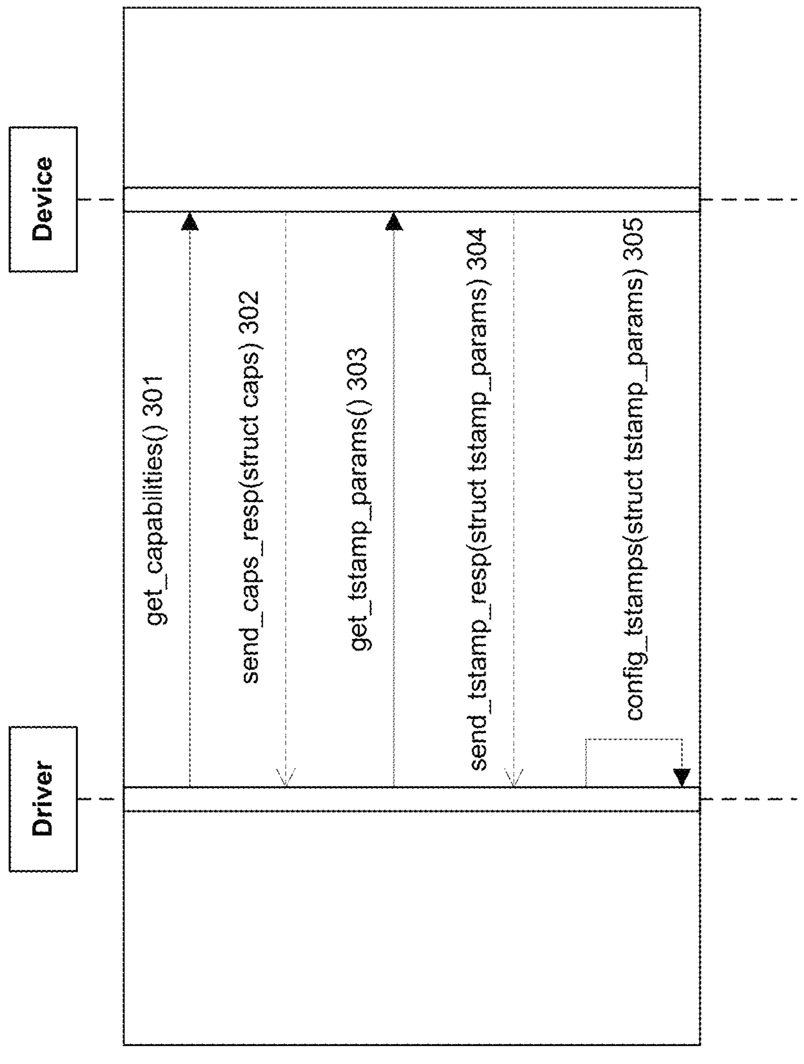
FIG. 3 depicts an example configuration flow.

FIG. 3 depicts an example configuration flow. Configuration could be implemented over a communication channel such as Windows® driver or Linux driver implementing Virtchannel. At 301, host driver ("driver") sends a request for timestamp translation capabilities (e.g., get_capabilities( )) to a network interface device (device). At 302, the device response indicates support for one or more timestamp translation features (e.g., send_caps_resp(struct caps)). At 303, driver sends indication of use of time-related features and requests use of time-related parameters (e.g., get_tstamp_params( )). Time-related parameters can include one or more of: timestamp bitfields in registers/descriptors (e.g., location and size), timestamp bit granularity (e.g., 1 μs per bit increment, or 2 μs per bit increment, etc.), valid timestamp window range based on relative timestamps and a timestamp horizon (e.g., maximum future timestamp or overflow threshold), driver behavior when the timestamp is out of the window range (e.g., indicate overflow, hold the packet until within range), use of absolute or relative timestamp values, including any details (e.g., relative to a reference timestamp value), or definition of exception timestamp values. At 304, a device can respond to driver to indicate some or all parameters that are supported (e.g., send_tstamp_resp(struct tstamp_params)). At 305, driver utilizes configurations and supported parameters indicated in 304 to convert timestamps received from device or provided to device (e.g., config_tstamps(struct tstamp_params)).

Figure 4:
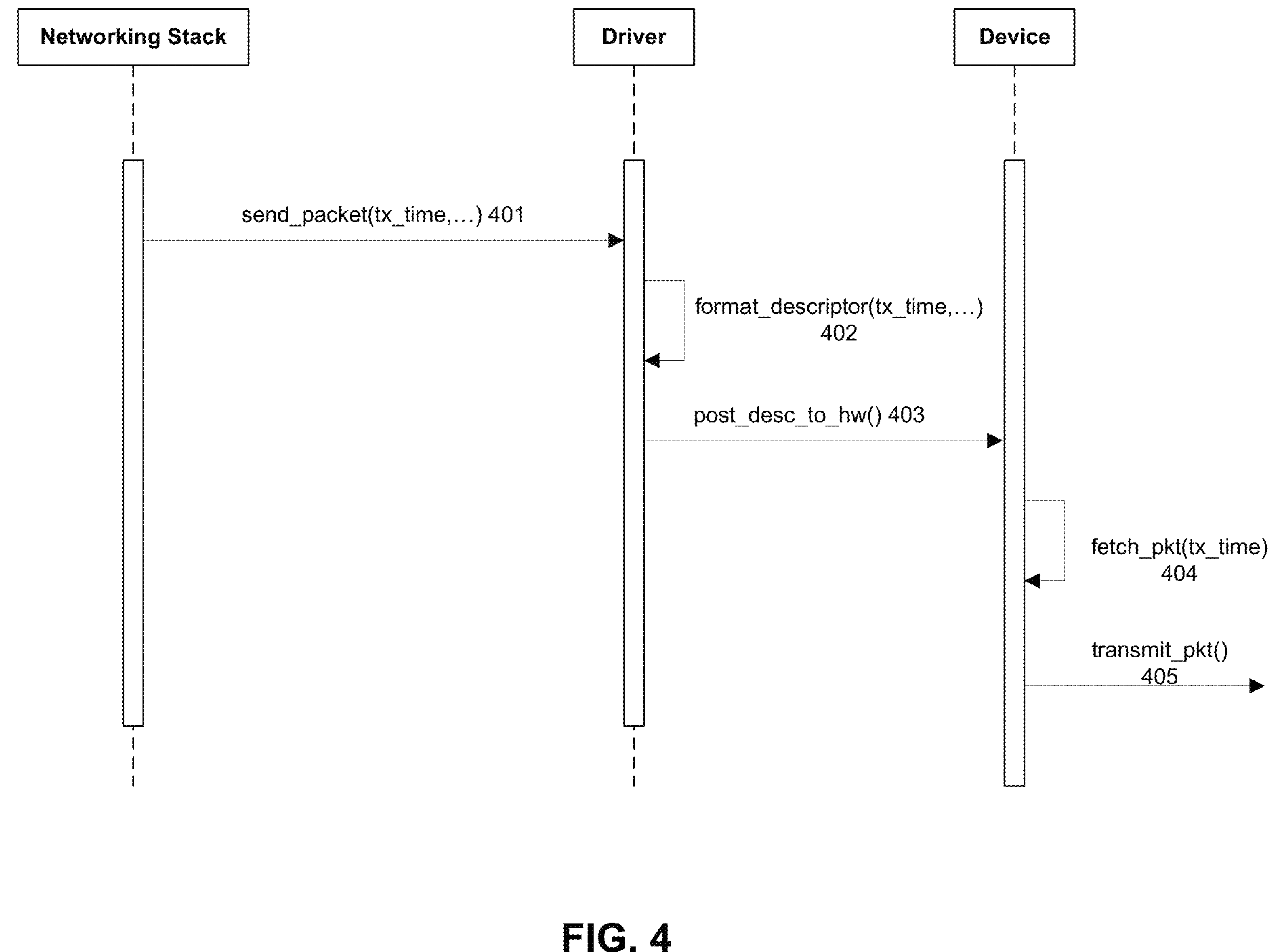
FIG. 4 shows a driver pacing packet transmit flow.

FIG. 4 shows a driver pacing packet transmit flow. At 401, a networking stack can request one or more packets to be transmitted by a driver with a specification of one or more transmit timestamps (e.g., send_packet(tx_time, . . . )). At 402, the driver can perform timestamp translation based on timestamp-related parameters from an earlier configuration to revise a format of the timestamp received from the networking stack (e.g., format_descriptor(tx_time, . . . )). At 403, the driver can post the Tx descriptor with translated timestamp to a device's Tx descriptor ring (e.g., post_desc_to_hw( )). At 404, the network interface device can fetch a packet for transmission corresponding to a current timeslot (e.g., fetch_pkt(tx_time)). At 405, the network interface device can transmit the fetched packet to a network medium at the specified time (e.g., transmit_pkt( )).

Figure 5:
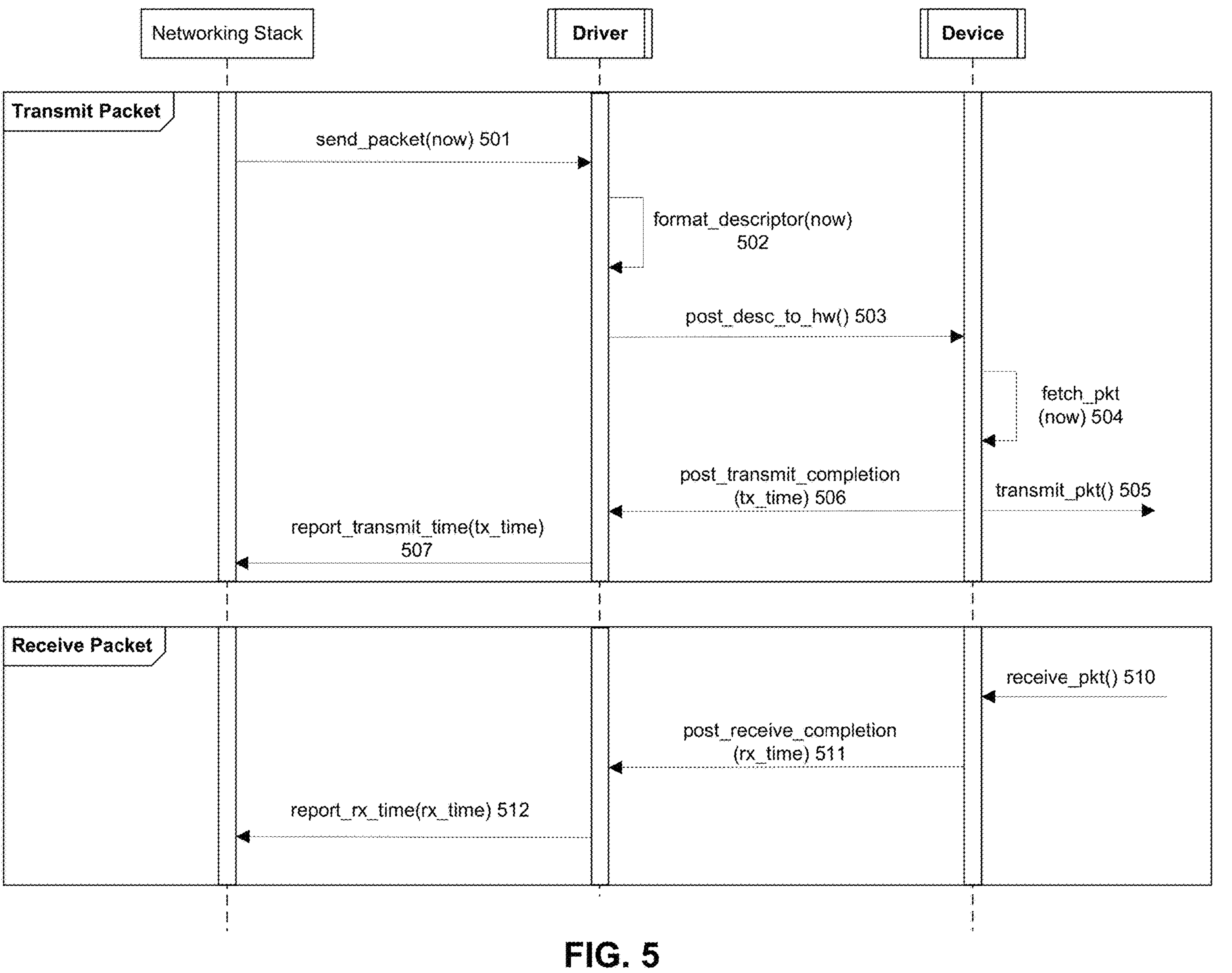
FIG. 5 shows Tx and receive (Rx) packet flows.

FIG. 5 shows Tx and receive (Rx) packet flows. Operations 501 to 505 are similar to respective operations 401 to 405 except variable (now) represents packets are not paced and specified as not paced, such as by time-related parameters. A value of 0 for the timestamp can indicate packets are not paced. At 506, at or after transmission of the packet, device can report a timestamp of packet transmission in a transmit completion descriptor to the host driver (e.g., post_transmit_completion(tx_time)). At 507, driver can report the transmit timestamp to networking stack after translation of the timestamp in a transmit completion descriptor based on parameters specified in a configuration (e.g., report_transmit_time(tx_time)).

At 510, based on receipt of a packet, the network interface device can record a timestamp of packet receipt (e.g., receive_pkt( )). At 511, the network interface device can communicate the timestamp of packet receipt in a receive descriptor to driver (e.g., post_receive_completion(rx-_time)). At 512, driver can report a timestamp of packet receipt to networking stack after translation of the timestamp in a receive completion descriptor based on parameters specified in a configuration (e.g., report_rx_time(rx_time)).

Figure 6A:
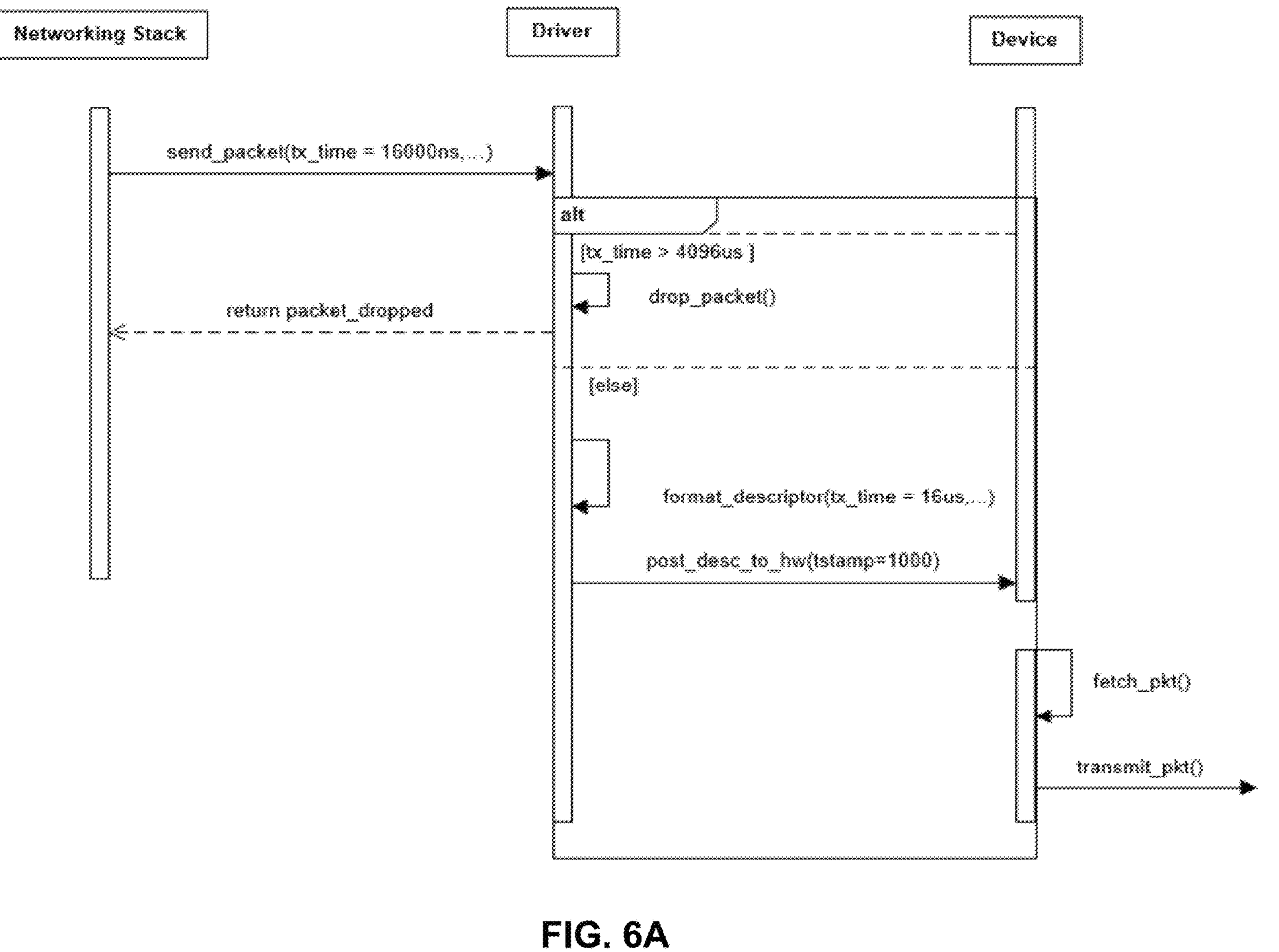
FIGS. 6A-6C depict examples of operation.
Figure 6B:
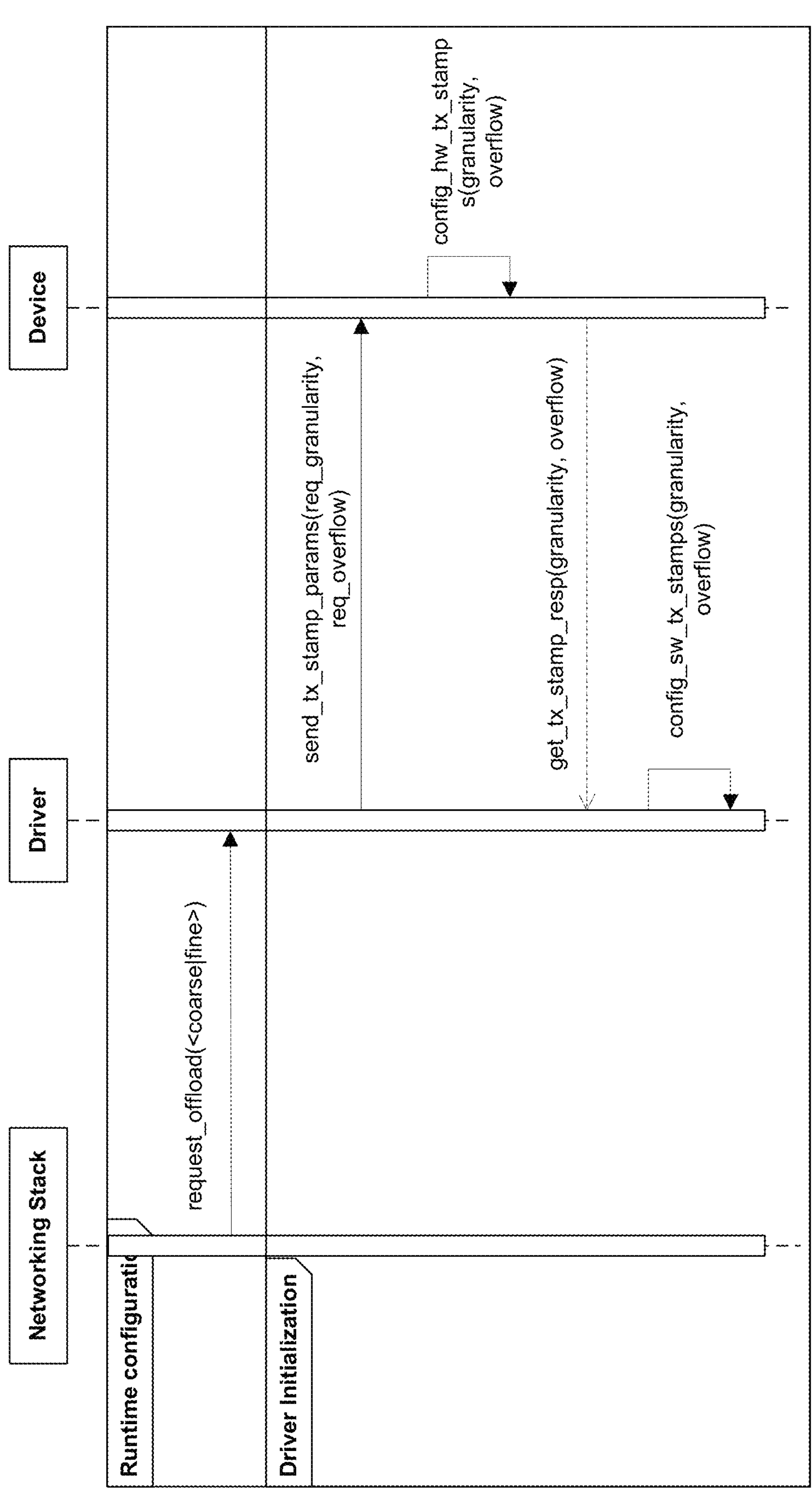
Figure 6C:
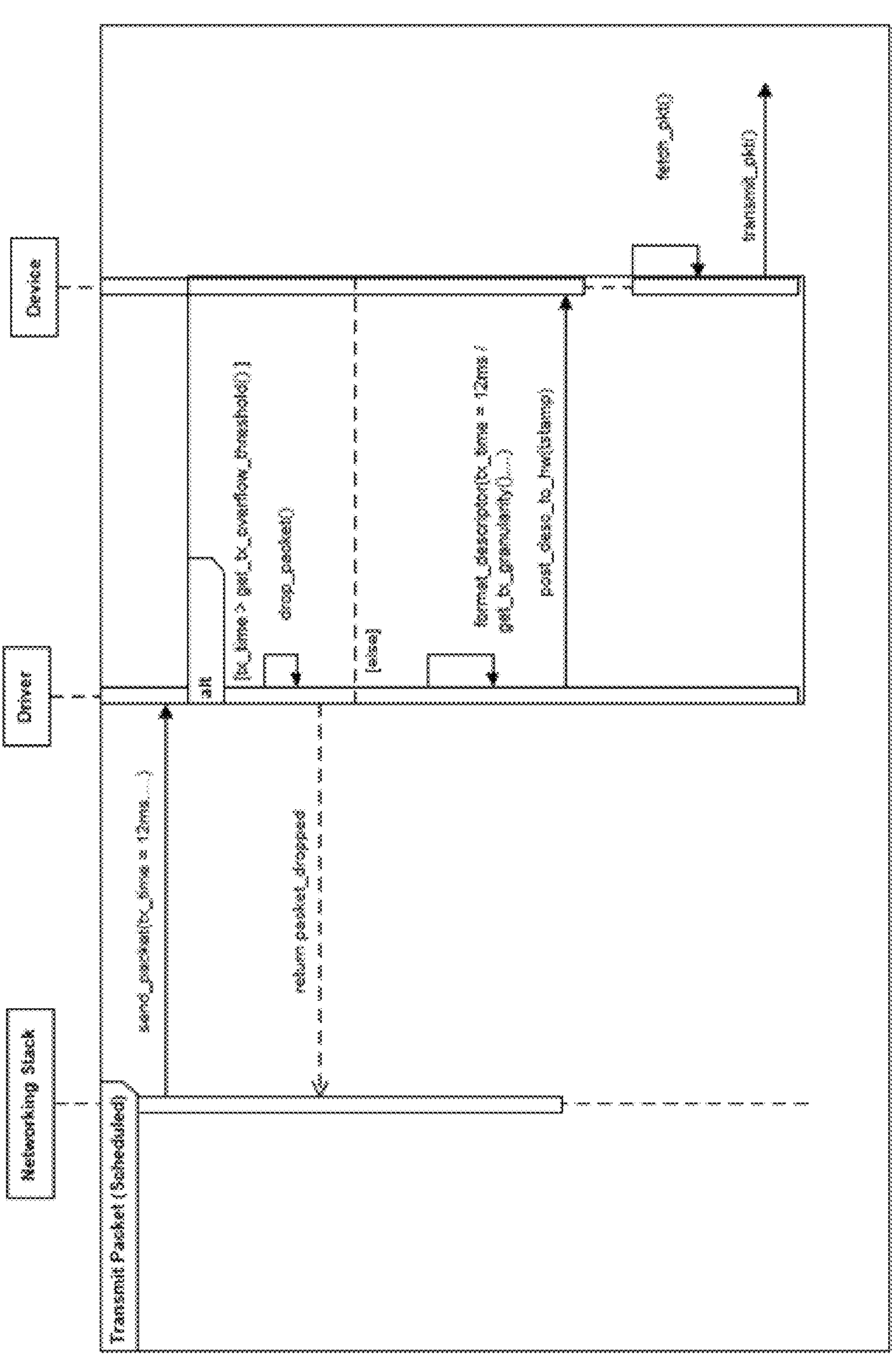

FIGS. 6A-6C depict examples of operation. FIG. 6A shows an example of the driver flow on a device (device A) with fixed parameters. Overflow threshold can represent a farthest point in time that a packet can be scheduled for transmission. In some examples, when a packet's scheduled transmit time is beyond the overflow threshold, it can be dropped, overflow in the transmit descriptor can be indicated, or packet transmit scheduling can occur at the latest possible time. When the networking stack schedules a packet for transmit, the driver can apply a static overflow threshold to determine if the packet is to be dropped. If the transmit timestamp of the packet is below the threshold, the timestamp can be converted to the appropriate units based on the granularity. Granularity can represent units of a timestamp. The device supports timestamps with a granularity of 16 nanoseconds and can accept scheduled packets up to 4096 microseconds from a current time. In this example, the driver converts the transmit timestamp from 16000 ns to 1000 in timestamp units, where a timestamp unit can represent 16 ns.

The driver is hardcoded to support this format and for a packet to be scheduled for transmit at a specific time, the driver converts the timestamp to a granularity of 16 nanoseconds or drops the packet if the scheduled time is greater than 4096 microseconds from the current time.

For example, a different device (e.g., device B) supports granularities of both 8 nanoseconds and 16 nanoseconds and can accept scheduled packets up to 8192 microseconds from the current time in the case of the 8 nanoseconds granularity, and up to 16384 microseconds from the current time in the case of 16 nanoseconds granularity. In order to support more than one set of parameters, device B could use a bit in the timestamp field to indicate a granularity the device is to use. In some cases, use of the device A and device B could require the development of two separate drivers.

FIG. 6B depicts an example of capabilities exchange between a driver and device. In some examples, device A and device B support parameter exchange with a driver and a same driver can be used to configure operation of both devices A and B.

The networking stack can request driver to perform timestamp capabilities negotiation with the device (e.g., request_offload(<coarse|fine>). Device may allow the driver to request certain timestamp parameters and the device provides timestamp parameters based on a policy configured on the device (e.g., get_tx_stamp_resp(granularity, overflow)). For example, device B may utilize 8 nanosecond granularity and 8192 microsecond overflow configuration. The driver can apply those timestamp parameters to convert timestamp values even if driver requests the coarser timestamp granularity (e.g., config_sw_tx_stamps(granularity, overflow)).

In some examples, the device may configure itself with the driver requested parameters (e.g., send_tx_stamp_params(req_granularity, req_overflow)), for example, if the networking stack requests such parameters through the driver. Furthermore, the device may allow the driver to change its timestamp parameters during runtime. For example, if the networking stack requests a more coarse-grained scheduling offload, the driver can attempt to renegotiate the timestamp parameters with the device. The driver can send its requested parameters, and, if accepted, the device can be reconfigured to accept the new parameters. The device can apply those timestamp parameters to convert timestamp values (e.g., config_hw_tx_stamps(granularity, overflow)).

FIG. 6C shows an example of application of overflow and timestamp conversion on a device where timestamp capabilities were exchanged as in FIG. 6B. Based on networking stack scheduling a packet for transmission, the driver can use the overflow threshold to determine if the packet is to be dropped based on the packet's timestamp. If the packet's timestamp is below the overflow threshold, the driver can convert the packet's timestamp to units based on the timestamp granularity negotiated at either initialization or runtime. In this example, the timestamp value of 12 ms is divided by the timestamp granularity to provide a converted transmit timestamp value. The device transmits the packet at or near the converted timestamp value.

Figure 7A:
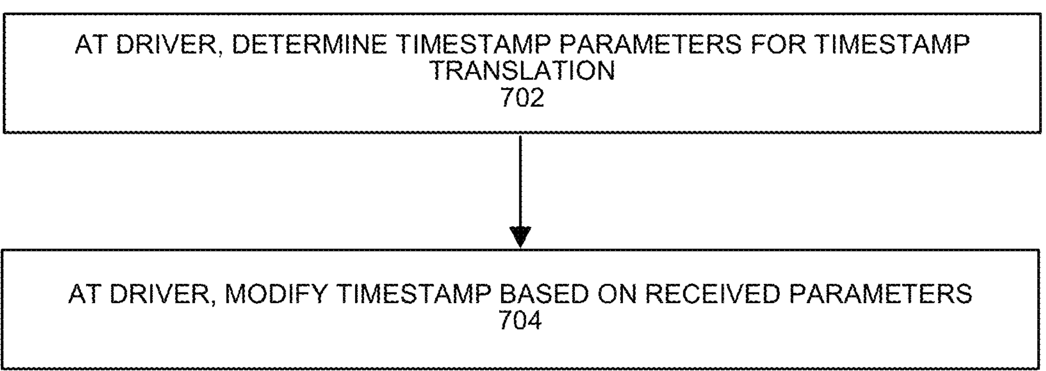
FIGS. 7A and 7B depict example processes.

FIG. 7A depicts an example process. At 702, a driver can determine timestamp parameters utilized by a device. For example, the timestamp parameters can be provided by the device to assist with timestamp translation. Time-related parameters can include one or more of: timestamp bitfields in registers/descriptors (e.g., location and size), timestamp bit granularity (e.g., 1 μs per bit increment, or 2 μs per bit increment, etc.), valid timestamp window range (e.g., relative timestamp range and timestamp horizon), driver behavior when the timestamp is out of the valid range (e.g., indicate overflow, hold the packet until within range), use of absolute or relative timestamp values, including any details (e.g., relative to a reference timestamp value), or definition of exception timestamp values. At 704, for a received timestamp value to be copied to the device or timestamp value received from the device, the driver can perform timestamp translation based on the parameters. The timestamp value can be modified in a transmit or receive descriptor.

Figure 7B:
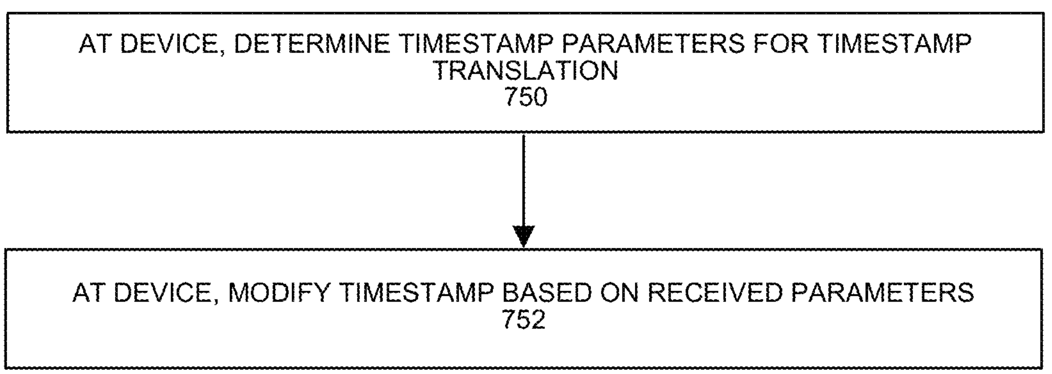

FIG. 7B depicts an example process. At 750, a device can determine timestamp parameters utilized by a driver. For example, the timestamp parameters can be provided by the driver to assist with timestamp translation. Examples of time-related parameters are described herein. At 752, for a received timestamp copied to the device or timestamp to be copied to the host, the device can perform timestamp translation based on the parameters. The timestamp value can be modified in a transmit or receive descriptor.

Figure 8:
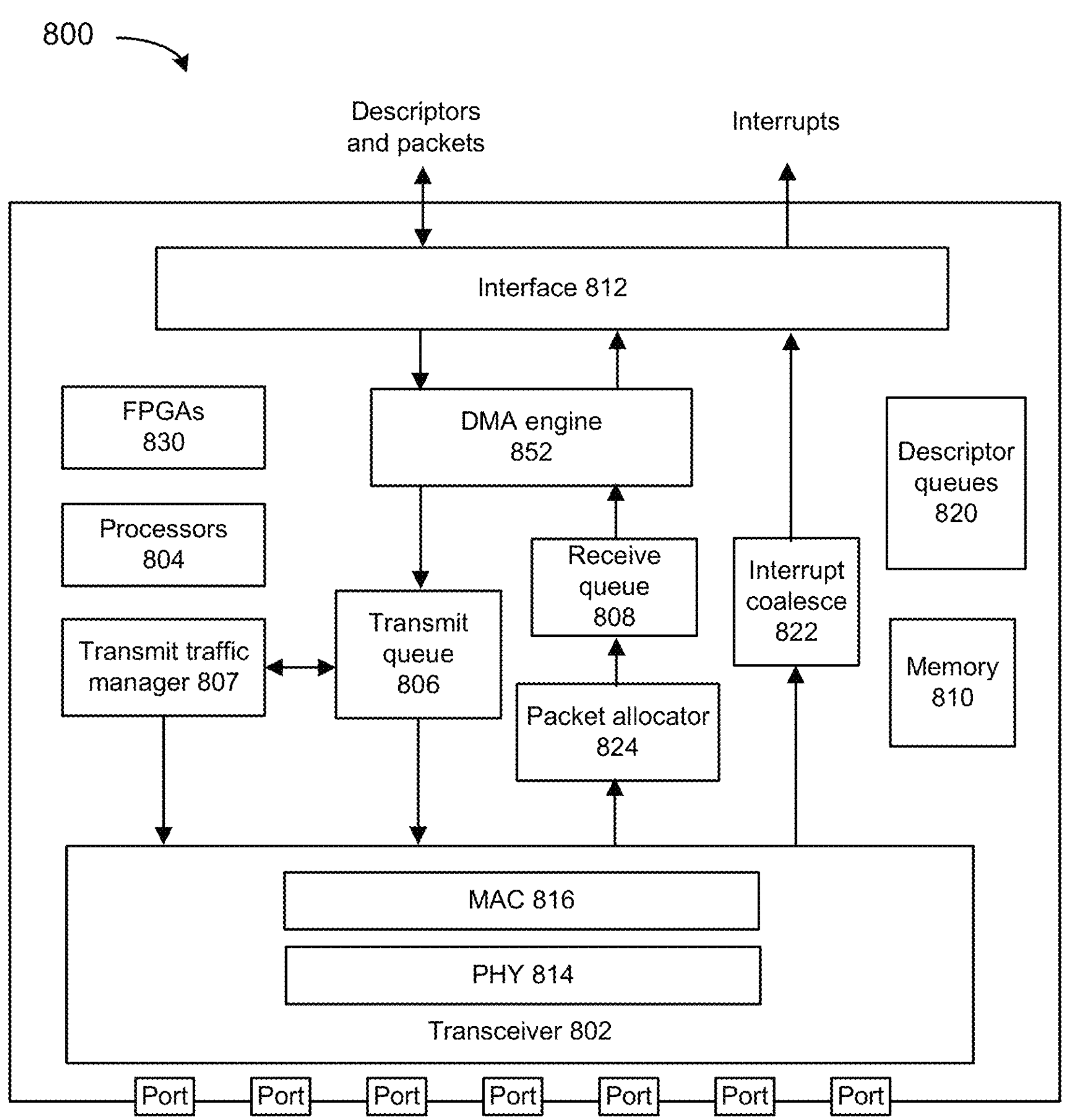
FIG. 8 depicts an example network interface device.

FIG. 8 depicts an example network interface device. Various hardware and software resources in the network interface can be configured to negotiate use of timestamp translation parameters and apply timestamp value translation, as described herein. In some examples, network interface 800 can be implemented as a network interface controller, network interface card, a host fabric interface (HFI), or host bus adapter (HBA), and such examples can be interchangeable. Network interface 800 can be coupled to one or more servers using a bus, PCIe, CXL, or DDR. Network interface 800 may be embodied as part of a system-on-a-chip (SoC) that includes one or more processors, or included on a multichip package that also contains one or more processors.

Some examples of network device 800 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to perform MAC address filtering on received packets, process MAC headers of received packets by verifying data integrity, remove preambles and padding, and provide packet content for processing by higher layers. MAC circuitry 816 can be configured to assemble data to be transmitted into packets, that include destination and source addresses along with network control information and error detection hash values.

For packets that are enqueued for transmission in transmit queue 806, transmit traffic manager 807 can perform performs the transmit scheduling, as described herein.

Processors 804 can be any a combination of: a processor, core, graphics processing unit (GPU), field programmable gate array (FPGA), application specific integrated circuit (ASIC), or other programmable hardware device that allow programming of network interface 800. For example, a "smart network interface" or SmartNIC can provide packet processing capabilities in the network interface using processors 804.

Processors 804 can include a programmable processing pipeline that is programmable by P4, C, Python, Broadcom Network Programming Language (NPL), NVIDIA® CUDA®, NVIDIA® DOCA™, or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. Processors 804 can be configured to negotiate use of timestamp value translation parameters and apply timestamp value translation, as described herein.

Packet allocator 824 can provide distribution of received packets for processing by multiple CPUs or cores using receive side scaling (RSS). When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with or based at least in part on PCI, PCI Express, PCI-x, Serial ATA, and/or USB (although other interconnection standards may be used), or proprietary variations thereof.

Figure 9:
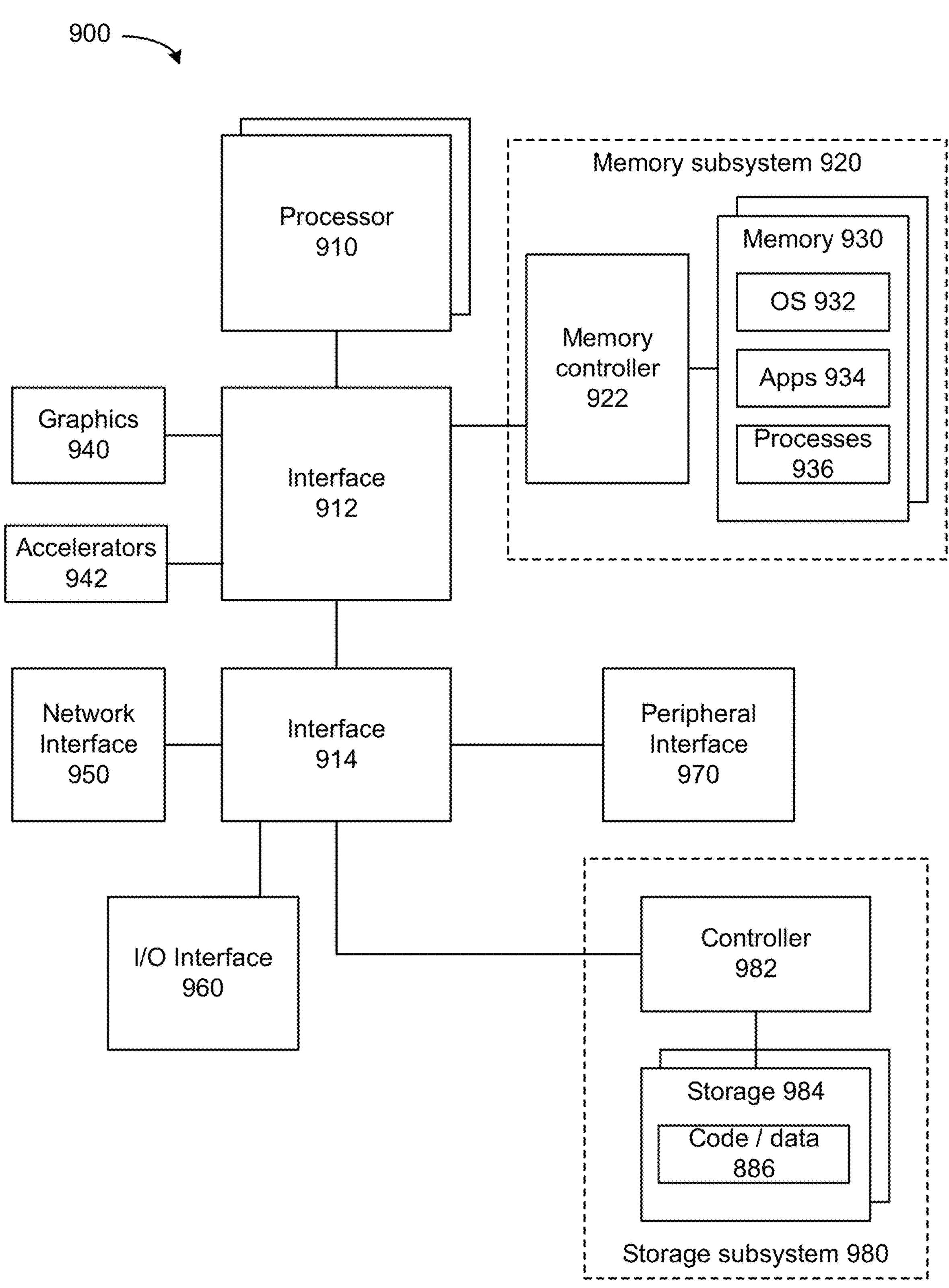
FIG. 9 depicts a system.

FIG. 9 depicts an example computing system. Components of system 900 (e.g., processor 910, network interface 950, and so forth) can be configured to negotiate use of timestamp value translation parameters and apply timestamp value translation, as described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can be configured to negotiate with network interface 950 to use of timestamp value translation parameters and apply timestamp value translation, as described herein.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 (e.g., packet processing device) can execute a virtual switch to provide virtual machine-to-virtual machine communications for virtual machines (or other VEEs) in a same server or among different servers.

Some examples of network interface 950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Figure 10:
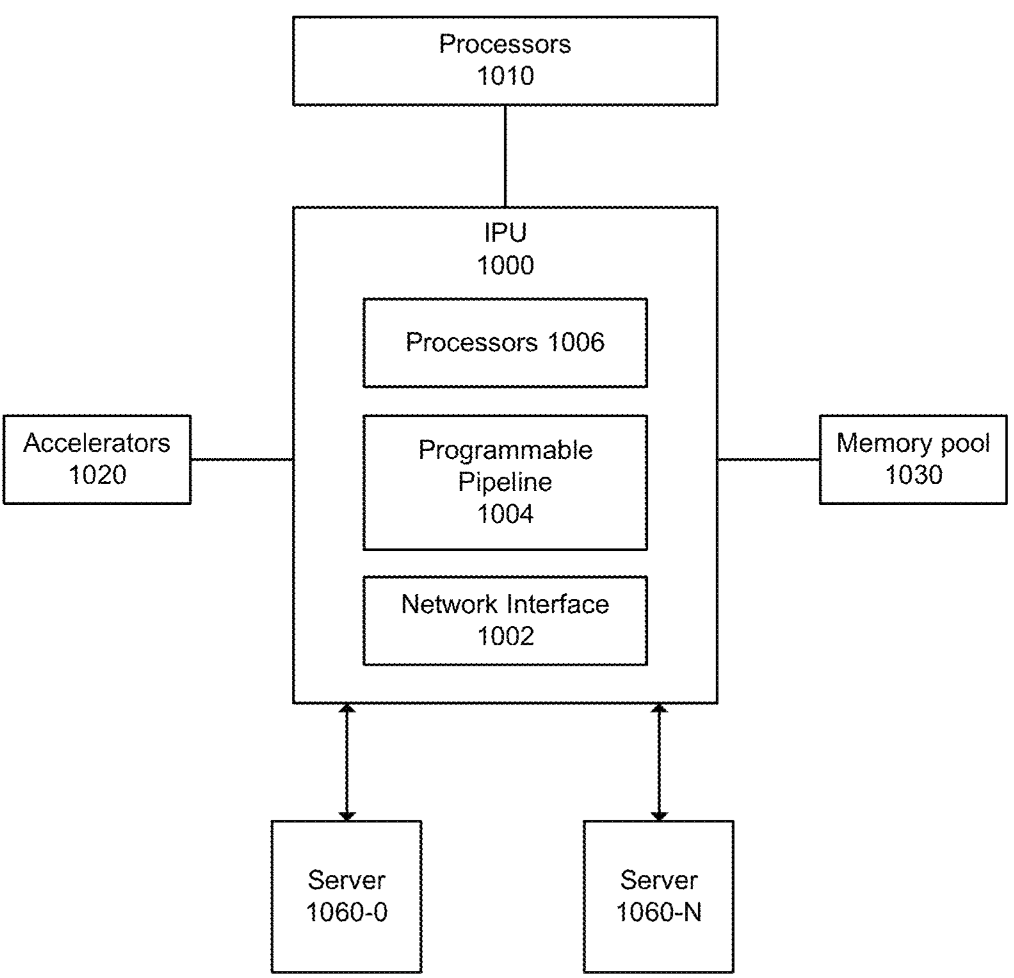
FIG. 10 depicts a system.

FIG. 10 depicts an example system. In this system, IPU 1000 manages performance of one or more processes using one or more of processors 1006, processors 1010, accelerators 1020, memory pool 1030, or servers 1040-0 to 1040-N, where N is an integer of 1 or more. In some examples, processors 1006 of IPU 1000 can execute one or more processes, applications, VMs, containers, microservices, and so forth that request performance of workloads by one or more of: processors 1010, accelerators 1020, memory pool 1030, and/or servers 1040-0 to 1040-N. IPU 1000 can utilize network interface 1002 or one or more device interfaces to communicate with processors 1010, accelerators 1020, memory pool 1030, and/or servers 1040-0 to 1040-N. IPU 1000 can utilize programmable pipeline 1004 to process packets that are to be transmitted from network interface 1002 or packets received from network interface 1002. Programmable pipeline 1004 and/or processors 1006 can be configured to negotiate use of timestamp value translation parameters and apply timestamp value translation, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to- MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a device comprising: first circuitry to negotiate supported timestamp parameters and selectively translate a timestamp associated with a packet based on the timestamp parameters and second circuitry to cause transmission of the packet based on the translated timestamp.

Example 2 includes one or more examples, wherein the selectively translate a timestamp associated with a packet based on the timestamp parameters comprises translate a value of the timestamp in a transmit descriptor associated with the packet.

Example 3 includes one or more examples, wherein the timestamp parameters comprise one or more of: timestamp field location and size, timestamp granularity, valid timestamp window horizon range, operation when the timestamp is out of a valid range, use of absolute or relative timestamp values, or definition of exception timestamp values.

Example 4 includes one or more examples, wherein the second circuitry comprises one or more of: a scheduler, traffic shaper, or egress circuitry.

Example 5 includes one or more examples, wherein the timestamp parameters comprise a valid range value and wherein the first circuitry is to drop the packet based on a value of the translated timestamp exceeding the valid range value.

Example 6 includes one or more examples, and includes at least one memory device to store the packet prior to transmission to a media.

Example 7 includes one or more examples, and includes the host system communicatively coupled to the packet processing device, wherein the host system is to execute a driver that is to negotiate supported timestamp parameters with the first circuitry.

Example 8 includes one or more examples, wherein the driver is to perform timestamp translation based on the timestamp parameters on one or more timestamps received from the packet processing device.

Example 9 includes one or more examples, and includes a datacenter, wherein the datacenter includes the host system and packet processing device and a second packet processing device that is to receive the packet transmitted from the packet processing device.

Example 10 includes one or more examples, wherein the packet processing device comprises one or more of: network interface controller (NIC), a remote direct memory access (RDMA)-enabled NIC, SmartNIC, router, switch, forwarding element, infrastructure processing unit (IPU), or data processing unit (DPU).

Example 11 includes one or more examples, and includes at least one non-transitory computer-readable medium comprising instructions stored thereon, that if executed by one or more processors, cause the one or more processors to: negotiate supported timestamp parameters with a device; selectively translate a timestamp associated with a packet based on the timestamp parameters; and provide the translated timestamp for access by the device.

Example 12 includes one or more examples, wherein the device comprises a packet processing device or a processor-executed driver.

Example 13 includes one or more examples, wherein the selectively translate a timestamp associated with a packet based on the timestamp parameters comprises translate a value of the timestamp in a transmit descriptor associated with the packet.

Example 14 includes one or more examples, wherein the timestamp parameters comprise one or more of: timestamp fields location and size, timestamp granularity, valid timestamp window horizon range, operation when the timestamp is out of a valid range, use of absolute or relative timestamp values, or definition of exception timestamp values.

Example 15 includes one or more examples, wherein the timestamp parameters comprise a valid range value and comprising instructions stored thereon, that if executed by one or more processors, cause the one or more processors to: drop the packet based on a value of the translated timestamp exceeding the valid range value.

Example 16 includes one or more examples, and includes a method comprising: negotiating supported timestamp parameters with a device; selectively translating a timestamp associated with a packet based on the timestamp parameters; and providing the translated timestamp for access by the device.

Example 17 includes one or more examples, wherein the device comprises a packet processing device or a processor-executed driver.

Example 18 includes one or more examples, wherein the selectively translating a timestamp associated with a packet based on the timestamp parameters comprises translating a value of the timestamp in a transmit descriptor associated with the packet.

Example 19 includes one or more examples, wherein the timestamp parameters comprise one or more of: timestamp field location and size, timestamp granularity, valid timestamp window horizon range, operation when the timestamp is out of valid range, use of absolute or relative timestamp values, or definition of exception timestamp values.

Example 20 includes one or more examples, wherein the timestamp parameters comprise a valid range value and comprising: dropping the packet based on a value of the translated timestamp exceeding the valid range value.

What is claimed is:

1. An apparatus comprising:

a packet processing device comprising:

a direct memory access (DMA) circuitry;

a network interface;

a host interface;

first circuitry to negotiate supported timestamp parameters with an operating system executed by a host system connected to the host interface and selectively translate a timestamp associated with a packet based on negotiated supported timestamp parameters, wherein:

the negotiation of supported timestamp parameters comprises a capabilities exchange between the operating system and the packet processing device, the timestamp parameters indicate a timestamp granularity of a bit, the timestamp granularity of the bit comprises a time interval from among multiple different time intervals, and the timestamp granularity of the bit is set by the negotiation of the supported timestamp parameters with the operating system; and second circuitry to cause transmission of the packet based on the translated timestamp.

2. The apparatus of claim 1, wherein the selectively translate the timestamp associated with the packet based on the timestamp parameters comprises translate a value of the timestamp in a transmit descriptor associated with the packet.

3. The apparatus of claim 1, wherein the timestamp parameters comprise: timestamp field location and size, valid timestamp window horizon range, operation when the timestamp is out of a valid range, use of absolute or relative timestamp values, and definition of exception timestamp values.

4. The apparatus of claim 1, wherein the second circuitry comprises one or more of: a scheduler, traffic shaper, or egress circuitry.

5. The apparatus of claim 1, wherein the timestamp parameters comprise a valid range value and wherein the first circuitry is to drop the packet based on a value of the translated timestamp exceeding the valid range value.

6. The apparatus of claim 1, comprising at least one memory device to store the packet prior to transmission to a media.

7. The apparatus of claim 1, comprising a host system communicatively coupled to the packet processing device, wherein the host system is to execute a driver that is to negotiate supported timestamp parameters with the first circuitry.

8. The apparatus of claim 7, wherein the driver is to perform timestamp translation based on the timestamp parameters on one or more timestamps received from the packet processing device.

9. The apparatus of claim 7, comprising a datacenter, wherein the datacenter includes the host system and packet processing device and a second packet processing device that is to receive the packet transmitted from the packet processing device.

10. The apparatus of claim 1, wherein the packet processing device comprises one or more of: network interface controller (NIC), a remote direct memory access (RDMA)-enabled NIC, SmartNIC, router, switch, forwarding element, infrastructure processing unit (IPU), or data processing unit (DPU).

11. At least one non-transitory computer-readable medium comprising instructions stored thereon, that if executed by one or more processors, cause the one or more processors to:

configure a host system to:

negotiate supported timestamp parameters with a device by a capabilities exchange between the host system and a device, wherein:

the timestamp parameters indicate a per-bit timestamp granularity, the timestamp granularity represented by a bit comprises a time duration from among multiple different time durations, and the time duration is determined by the negotiation of the timestamp parameters between the host system and the device;

selectively translate a timestamp associated with a packet based on the timestamp parameters; and provide the translated timestamp for access by the device.

12. The at least one computer-readable medium of claim 11, wherein the device comprises a packet processing device or a processor-executed driver.

13. The at least one computer-readable medium of claim 11, wherein the selectively translate the timestamp associated with a packet based on the timestamp parameters comprises translate a value of the timestamp in a transmit descriptor associated with the packet.

14. The at least one computer-readable medium of claim 11, wherein the timestamp parameters comprise three or more of: timestamp fields location and size, timestamp granularity, valid timestamp window horizon range, operation when the timestamp is out of a valid range, use of absolute or relative timestamp values, or definition of exception timestamp values.

15. The at least one computer-readable medium of claim 11, wherein the timestamp parameters comprise a valid range value and comprising instructions stored thereon, that if executed by one or more processors, cause the one or more processors to:

drop the packet based on a value of the translated timestamp exceeding the valid range value.

16. A method comprising:

negotiating, by a host system, supported timestamp parameters with a device by a capabilities exchange between the host system and the device;

selectively translating, by the host system, a timestamp associated with a packet based on the timestamp parameters, wherein the timestamp parameters indicate a timestamp granularity of a bit, the timestamp granularity of the bit comprises a time interval from among multiple different time intervals, and the timestamp granularity of the bit is set by the negotiation of the timestamp parameters with the device; and providing, by the host system, the translated timestamp for access by the device.

17. The method of claim 16, wherein the device comprises a packet processing device or a processor-executed driver.

18. The method of claim 16, wherein the selectively translating the timestamp associated with the packet based on the timestamp parameters comprises translating a value of the timestamp in a transmit descriptor associated with the packet.

19. The method of claim 16, wherein the timestamp parameters comprise: timestamp field location and size, timestamp granularity, valid timestamp window horizon range, operation when the timestamp is out of valid range, use of absolute or relative timestamp values, and definition of exception timestamp values.

20. The method of claim 16, wherein the timestamp parameters comprise a valid range value and comprising:

dropping, by the host system, the packet based on a value of the translated timestamp exceeding the valid range value.

* * * * *